United States Patent

[11] 3,623,530

[72] Inventors Marvin E. Beyers;
 Charles C. Sons, Jr., both of Peoria, Ill.
[21] Appl. No. 839,406
[22] Filed July 7, 1969
[45] Patented Nov. 30, 1971
[73] Assignee Caterpillar Tractor Co.
 Peoria, Ill.

[54] LOCKRING FOR TIRE RIMS
 1 Claim, 3 Drawing Figs.
[52] U.S. Cl. .................................................. 152/410
[51] Int. Cl. .................................................. B60c 15/02
[50] Field of Search .................................................. 152/405,
 410, 409 RS; 285/332, 425, 342

[56] References Cited
UNITED STATES PATENTS

| | | | |
|---|---|---|---|
| 2,808,870 | 10/1957 | Riggs............................ | 152/410 |
| 3,225,426 | 12/1965 | Walther........................ | 152/410 X |
| 3,160,442 | 12/1964 | Walters et al................. | 301/9 TV UX |
| 3,301,576 | 1/1967 | Vigneron...................... | 285/332 X |

*Primary Examiner*—Arthur L. La Point
*Assistant Examiner*—George H. Libman
*Attorney*—Fryer, Tjensvold, Feix, Phillips & Lempio ABSTRACT: A lockring which fits between the rimbase and removable bead seat band of the rim for a large pneumatic tire and having surfaces mating with surfaces of the bead seat band and rimbase disposed at angles with which result in great frictional contact when the tire is inflated. This produces a wedging effect and eliminates the need for "drivers" which are interengaging lugs on the rimbase and removable bead seat band to prevent relative rotation of these parts.

PATENTED NOV 30 1971　　3,623,530
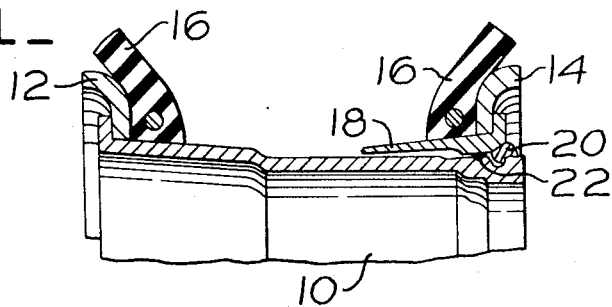
Fig-1-
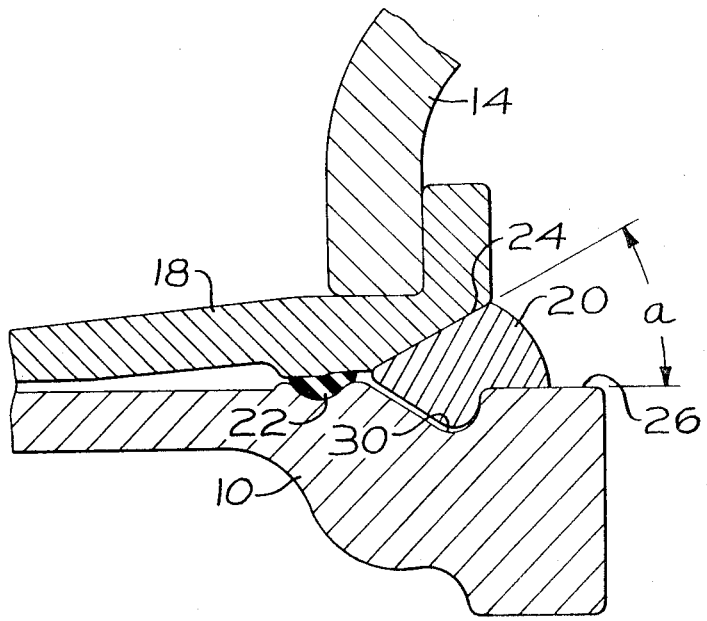
Fig-2-
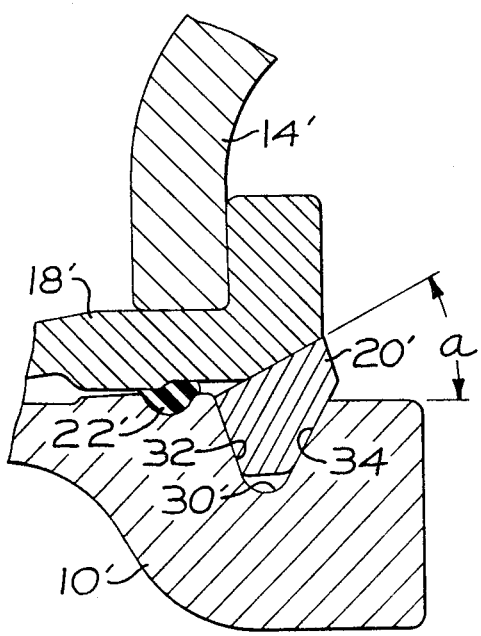
Fig-3-
INVENTORS
MARVIN E. BEYERS
CHARLES C. SONS, JR.
BY
Fryer, Tjensvold, Feix, Phillips + Lempio
ATTORNEYS

LOCKRING FOR TIRE RIMS

Demountable flange rims for tubeless tires generally have two seats against which the tire beads are wedged in sealing engagement, one such seat is integral with the rimbase and the other is held on the base by a split lockring which fits within and protrudes from a groove in the base. Rotation between the removable bead seat and the rimbase must be prevented for reasons which will presently appear and interengaging lugs welded to these two parts have traditionally been used to prevent such rotation. The lugs have been welded to the parts and are not only costly, but are subject to failure because of cracking caused by welding stresses.

The present invention eliminates the need for such lugs or "drivers" as they are known by providing a configuration of split lockring and related parts which produces a very strong friction driving connection between the parts and prevents undesirable relative rotation. A more complete understanding of the present invention will be gained from the following specification wherein reference is made to the accompanying drawing.

In the drawing, FIG. 1 is a sectional view through a tire rim embodying the invention;

FIG. 2 is an enlarged fragmentary view showing the right side only of the tire rim in FIG. 1; and FIG. 3 is a view like FIG. 2 illustrating a modification of the invention.

In FIG. 1 of the drawing, a large tire rim is shown as made up of a rimbase 10 and two side flanges 12 and 14 between which the beads 16 of a tire are confined. The beads are in sealing engagement with bead seats, one being a permanent part of the rimbase and the other being in the form of a removable bead seat band shown at 18. This is retained against outward movement with respect to the rimbase by means of a split lockring 20, better shown in FIG. 2, which snaps into a groove in the rimbase in a position to obstruct movement of the bead seat band and the side flange 14 when the tire is inflated. A seal in the form of an elastic O-ring 22 is disposed between the removable bead seat band and the rimbase to prevent escape of air from between these parts.

The assembly described and shown is conventional with the exception of the split lockring and parts with which it is associated which present an improvement over conventional locking means used in this environment in that they provide wedging surfaces which ensure that the rimbase and the removable bead seat band will turn in the manner of a single part so that drivers or interlocking lugs need not be employed between these parts.

As best illustrated in 2 mating surfaces between the bead seat 18 and the lockring 20 which are shown at 24 are disposed at an angle to the annular surface 26 of the ring base, or at an angle to the direction of movement bead seat band as it is removed from the rimbase, of somewhat less than 30° or approximately 28° which is considered optimum for obtaining a satisfactory wedging action as inflation of the tire tends to move the seat band outwardly. Too small an angle can produce excessive wedging which tends to prevent separation of the parts. It is believed that the angle $a$ shown in FIG. 2 should be as great or greater than 24° but not more than 32°. As the removable bead seat is urged outwardly, pressure is created between the surfaces at 24 and also between the lockring and surface 26 of the rimbase. The lockring does not extend to the very bottom of the groove 30 within which it is retained so that compression against the surface 26 is made possible.

A modified form of the invention is shown in FIG. 3 wherein primed reference characters corresponding to those of FIG. 2 are employed to identify corresponding parts. In this view, the same angle $a$ is employed between the bead seat band and the lockring and similar wedging angles are employed between the lock ring and the sides of the groove 30' by which it is retained. The angles between a vertical line passing centrally through the groove 30' and its two sidewalls 32 and 34 are approximately the same of slightly smaller than the angle $a$ so that inward force resulting from the wedging action creates a wedging action at these surfaces to prevent rotation of the lock ring 20'.

The invention as herein described has proven effective in preventing relative rotation between the rimbase and the removable bead seat band and thus also preventing destruction of the seal by the O-ring between these parts, as well as other undesirable results of such relative rotation.

What is claimed is:

1. A multiple-piece tire rim assembly for mounting large diameter, wide-base tire means subject to high-torque loading during use comprising; an annular one-piece rimbase means, said rimbase means having a fixed, tire-bead-retaining annular flange means mounted upon one axial end thereof and an axially moveable, tire-bead-retaining annular flange means mounted upon the other axial end thereof, said axially movable flange means having an annular surface means which is inclined at a predetermined angle of between 24° and 30° with respect to the axis of said annular rimbase means, a split-ring locking means mounted upon said other axial end of said rimbase means, said locking means having surface means which coact with said annular surface means when a tire means is operatively mounted upon said tire rim assembly, annular groove means in said rimbase means having sidewalls tapering axially inwardly toward each other and inclined with respect to a line normal to said axis of said annular rimbase means at said predetermined angle, said locking means also having complementary taper portions which engage each of said sidewalls a locking effect and to prevent any relative tangential movement between said movable flange means, said locking means, and said rim base means when said tire rim assembly is under high-torque loading during use.

* * * * *

FO-1050
(5/69)

UNITED STATES PATENT OFFICE
CERTIFICATE OF CORRECTION

Patent No. 3,623,530          Dated November 30, 1971

Inventor(s) Marvin E. Beyers and Charles C. Sons, Jr.

It is certified that error appears in the above-identified patent and that said Letters Patent are hereby corrected as shown below:

Claim 1, column 2, line 49, after "sidewalls", --to produce-- should be inserted; lines 32, 33, 39, 44, and 46: "rimbase" should read --rim base--; line 35 "ally moveable" should read --ally-movable--; line 36, a hyphen (-) should be inserted between "axially" and "mova-"; line 40, the hyphen (-) following "rim" should be deleted.

Signed and sealed this 9th day of May 1972.

(SEAL)
Attest:

EDWARD M. FLETCHER, JR.          ROBERT GOTTSCHALK
Attesting Officer          Commissioner of Patents